S. GIACOLETTO.
PEDAL OPERATING DEVICE.
APPLICATION FILED SEPT. 27, 1917.
1,311,223.
Patented July 29, 1919.
2 SHEETS—SHEET 1.
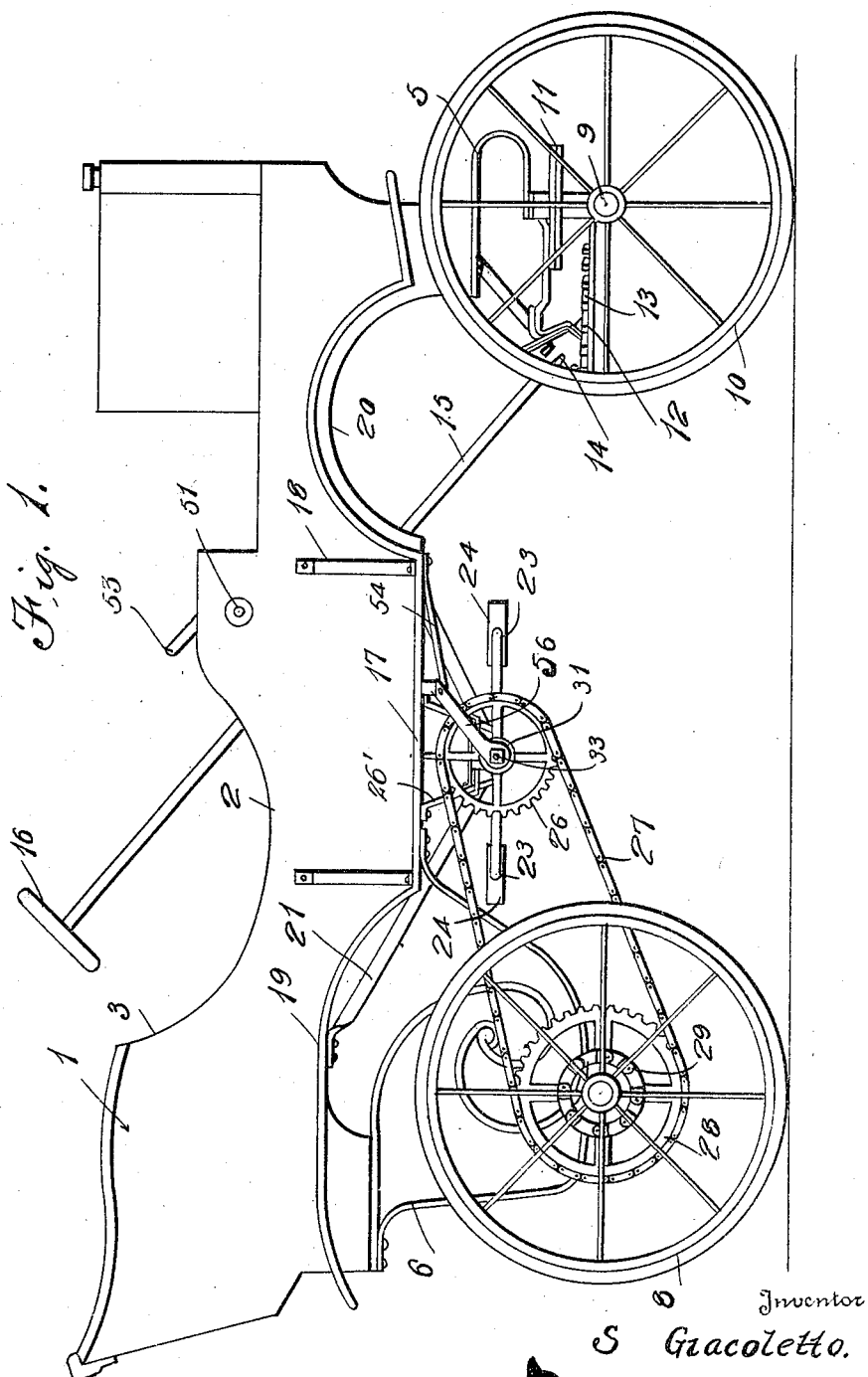

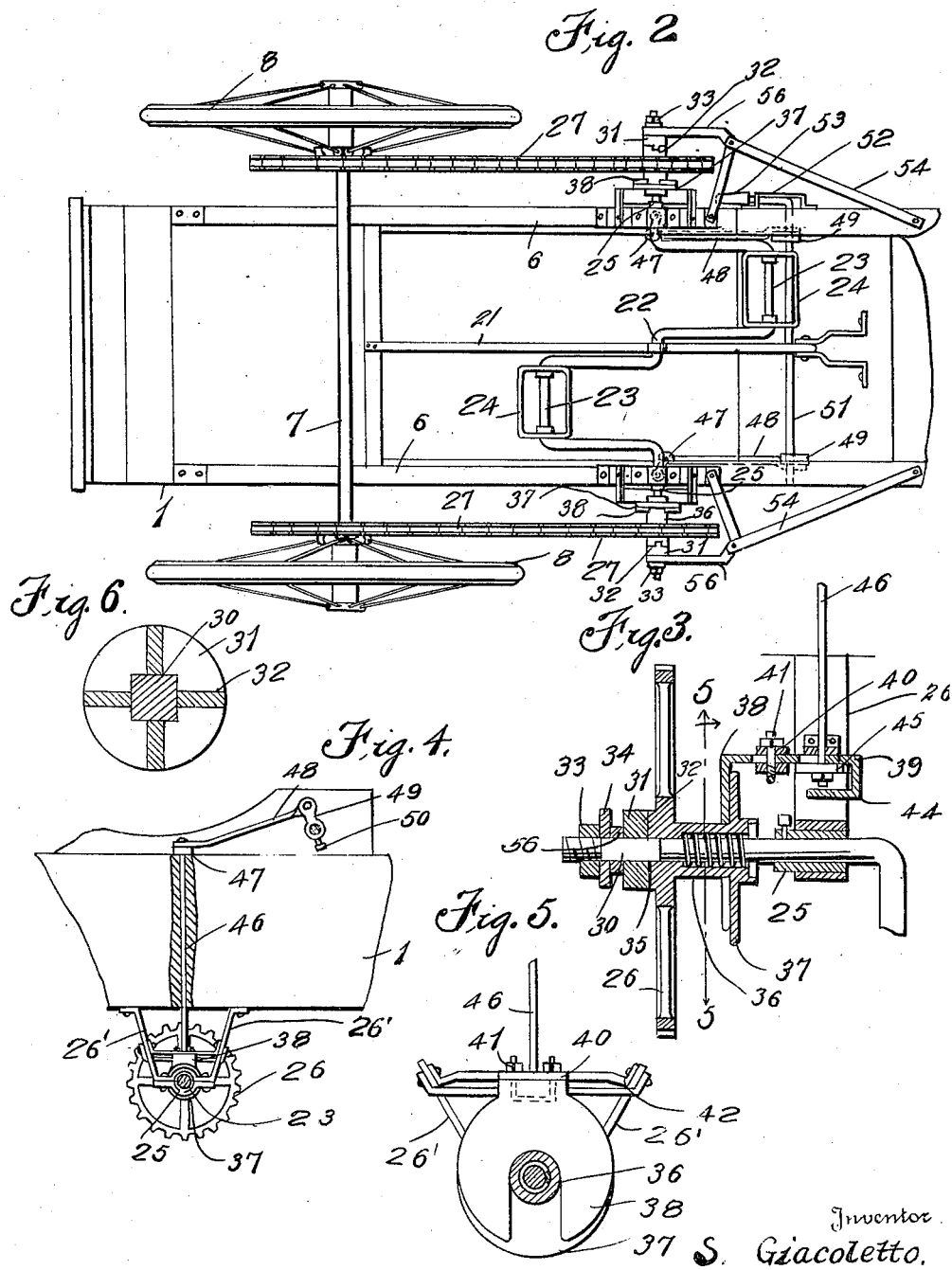

UNITED STATES PATENT OFFICE.

SAVINO GIACOLETTO, OF HANCOCK, MICHIGAN.

PEDAL-OPERATING DEVICE.

1,311,223. Specification of Letters Patent. Patented July 29, 1919.

Application filed September 27, 1917. Serial No. 193,581.

*To all whom it may concern:*

Be it known that I, SAVINO GIACOLETTO, a citizen of the United States, residing at Hancock, in the county of Houghton and State of Michigan, have invented certain new and useful Improvements in Pedal-Operating Devices; and I do hereby declare the following to be a full, clear, and exact description of the invention, such as will enable others skilled in the art to which it appertains to make and use the same.

This invention relates to improvements in a pedal operating device for children's vehicles and has for one of its objects the provision of a device of this character whereby the vehicle may be easily and quickly propelled by a child's feet.

Another object of this invention is the provision of means whereby the child may stop the rotation of the pedals and permit the vehicle to travel or proceed under its own momentum, thus obviating the necessity of the child working its feet while traveling down grade.

A further object of this invention is the provision of a pedal operating device of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation of a pedal operating device constructed in accordance with my invention, Fig. 2 is a bottom plan view of the same, Fig. 3 is a detail sectional view illustrating the clutch mechanism for starting and stopping the driving action of the pedals, Fig. 4 is a fragmentary sectional view illustrating means for controlling the clutch mechanism, Fig. 5 is a sectional view taken on the line 5—5 of Fig. 3, and Fig. 6 is a sectional view of one of the clutch elements.

Referring in detail to the drawings, the numeral 1 indicates as an entirety a child's vehicle consisting of a body 2 provided with a seat 3. The body 2 is mounted upon suitable front and rear springs 5 and 6. The rear springs 6 are secured to a rear axle 7 on which are journaled rear wheels 8. The front springs 5 are secured to a front axle 9 on which are journaled front wheels 10. A fifth wheel 11 is disposed between the front springs 5 and the front axle to permit the front axle to turn with relation to the body 2 so as to steer the same. The front axle 9 has secured thereto the segment 12 on which are formed teeth 13 that mesh with a cone gear 14 carried by a steering post 15. The steering post 15 is journaled in the body 2 of the car and extends upwardly and rearwardly in close proximity to the rear seat 3 and has secured to its upper end a steering wheel 16 whereby the occupant of the vehicle may readily turn the front axle 9 in either direction to steer the device.

The body 2 has secured to each side thereof a step 17 by means of brackets 18. The steps 17 have connected thereto mud guards 19 that are disposed over the front and rear wheels 10 and 8 and secured to the body 2 in any suitable manner. The body 2 adjacent the front wheels is provided with cut away portions 20 for the purpose of permitting the front wheels to turn under the body so as to be able to turn the vehicle at abrupt corners. The front mud guards are also curved to conform to the contour of the cut away portions 20 of the body 2. The bottom of the body 2 adjacent the rear seat 3 is cut away so as to permit the child's feet occupying the rear seat 3 to depend downwardly in engagement with propelling pedals which will be hereinafter more fully described.

A substantially V-shaped supporting brace 21 is secured to the bottom of the body 2 and has journaled in the apex thereof a propeller shaft 22 which is provided with cranks 23. The cranks 23 have journaled thereon the foot pedals 24. The ends of the operating or propelling shaft 22 are journaled in bearings 25 carried by suitable brackets 26' secured to the body 2.

The ends of the operating or propelling shaft 22 project beyond the bearings 25 and the sides of the body 2 and have journaled thereon sprocket wheels 26. The sprocket wheels 26 have mounted thereon endless chains 27 that pass over sprocket wheels 28 secured to the spokes of the rear wheels 8 by suitable fastening means 29. The outer ends of the operating or propelling shaft 22 are squared as illustrated at 30 and have mounted thereon clutch elements 31 in the formation of disks having projecting ribs 32. The clutch elements 31 are provided with squared bores to receive the squared portions 30 upon the propelling or operating shaft 22 and are held thereon by means of nuts 33 threaded to the ends of the propeller or operating shaft. Suitable washers 34 are interposed between the nuts 33 and the arms 56. The outer hub portions 35 of the sprocket wheels 26 are provided with recesses to receive the ridges 32 upon the clutch elements 31 to establish a connection between the sprocket wheels and the propeller shaft 22, so that upon turning of the propeller shaft, the sprocket wheels are compelled to move therewith.

The inner hub portions 36 of the sprocket wheels 26 have formed thereon annular flanges 37 which are engaged by bifurcated members 38 having horizontal portions 39 that are slidably secured to supporting brackets 40 by means of bolts 41. The supporting brackets 40 are secured to the supporting brackets 26′ as illustrated at 42. The inner ends of the horizontal portions 39 of the members 38 are bent downwardly and rearwardly upon themselves to form housings 44 which have disposed therein eccentric disks 45 carried by vertical shafts 46 that extend through slots in the horizontal portions 39 of the members 38. The vertical shafts 46 are journaled in the body 2 and have secured to their upper ends laterally extending arms 47 to which are pivoted rods 48. The rods 48 are pivoted to brackets 49 that are adjustably secured by means of set screws 50 to a transverse shaft 51. The transverse shaft 51 is journaled in the body 2 and has one end thereof bent at a right angle to form a controlling lever 52 on which is secured a hand grip 53, whereby upon moving the lever 52 in one direction, the sprocket wheels 26 will be slid upon the propeller shaft 22 to disengage the clutch elements 35 thereon from engagement with the clutch elements 31 secured to the propeller shaft so that the pedals 24 may remain idle while the rear wheels 8 rotate. When it is desired to rotate the rear wheels 8 by the pedals 24, the lever 52 is moved in an opposite direction causing the clutch elements upon the sprocket wheels 26 to engage the clutch elements 31 upon the shaft, thus a child occupying the rear seat may turn the propeller shaft 22 with its feet, driving the rear wheels 8.

Suitable braces 54 are secured to the body 2 upon each side thereof and have secured thereon arms 56 which are provided with bearings to receive the outer ends of the propeller or operating shaft 22.

From the foregoing description taken in connection with the accompanying drawings, it will be noted that a child's vehicle has been provided which can be readily and conveniently propelled by the feet of the child occupying the rear set, whereby said child can readily and conveniently steer the vehicle. It will also be noted that when the child desires to coast in the vehicle, the lever 52 may be swung in one direction to disengage the clutch element permitting the pedals 24 to remain idle while the vehicle travels down grade.

While I have shown and described the preferred embodiment of my invention, it will be understood that minor changes in construction, combination and arrangement of parts may be made without departing from the spirit and scope of the invention as claimed.

What is claimed is:—

A pedal operated device including a body mounted on front and rear axles having wheels journaled thereon, a crank shaft having pedals and journaled to said body, clutch members secured to the shaft, sprocket wheels slidably and rotatably mounted on the shaft, means connecting the sprocket wheels to the rear wheels, clutch members formed on the hubs of the sprocket wheels, disks formed on the hubs of the sprocket wheels, forked levers engaging the disks and slidably mounted on the body and having angularly related portions, rods journaled to the body, eccentrics secured to the rods and engaging the angularly related portions, and means for rotating the rods to engage and disengage the first and second named clutch members.

In testimony whereof I affix my signature in presence of two witnesses.

SAVINO GIACOLETTO.

Witnesses:
 MARTIN ZINETTI,
 JOHN BROCCO.